United States Patent
Chang et al.

(10) Patent No.: US 11,098,068 B2
(45) Date of Patent: *Aug. 24, 2021

(54) METHOD OF MAKING A HALOSILOXANE

(71) Applicant: DOW SILICONES CORPORATION, Midland, MI (US)

(72) Inventors: Noel Mower Chang, Midland, MI (US); Barry Ketola, Freeland, MI (US); Andrew Millward, Midland, MI (US); Xiaobing Zhou, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/613,130

(22) PCT Filed: May 24, 2018

(86) PCT No.: PCT/US2018/034344
§ 371 (c)(1),
(2) Date: Nov. 13, 2019

(87) PCT Pub. No.: WO2018/226420
PCT Pub. Date: Dec. 13, 2018

(65) Prior Publication Data
US 2020/0190123 A1 Jun. 18, 2020

Related U.S. Application Data

(60) Provisional application No. 62/515,604, filed on Jun. 6, 2017.

(51) Int. Cl.
C07F 7/12 (2006.01)
(52) U.S. Cl.
CPC ................... C07F 7/125 (2013.01)
(58) Field of Classification Search
CPC .................. C07F 7/126; C07F 7/125
See application file for complete search history.

(56) References Cited

U.S. PATENT DOCUMENTS

| | | | | |
|---|---|---|---|---|
| 4,602,094 A | * | 7/1986 | Mitchell | C07F 7/0896 546/14 |
| 2014/0004357 A1 | * | 1/2014 | Zhou | H01L 21/02164 428/446 |
| 2017/0029446 A1 | * | 2/2017 | Ketola | C07F 7/10 |
| 2020/0095268 A1 | * | 3/2020 | Chang | C08G 77/06 |
| 2020/0181332 A1 | * | 6/2020 | Grottenmueller | C08K 9/06 |

FOREIGN PATENT DOCUMENTS

| | | | |
|---|---|---|---|
| CA | 767686 A | 9/1967 | |
| EP | 1110965 A2 | * 6/2001 | ............ C07F 7/0874 |
| JP | 45000415 B | 1/1970 | |
| JP | 57035526 A | 2/1982 | |

OTHER PUBLICATIONS

CAS Abstract EP 1110965 (2001) (Year: 2001).*
English-Language Machine Translation of EP 1110965 (2001) (Year: 2001).*
D. Seyferth et al., 23 Inorganic Chemistry, 4412-4417 (1984) (Year: 1984).*
W. Schumb et al., 69 Journal of the American Chemical Society, 726 (1947) (Year: 1947).*
W. Schumb et al., 72 Journal of the American Chemical Society, 3178-3182 (1950) (Year: 1950).*
S. Basenko et al., 451 Doklady Chemistry, 203-206 (2013) (Year: 2013).*
S. Basenko et al., 451 Doklady Chemistry, 135-138 (2013) (Year: 2013).*
S. Basenko et al., 78 Russian Journal of General Chemistry, 1635-1637 (2008) (Year: 2008).*
Y. Pai et al., 5 Organometallics, 683-690 (1986) (Year: 1986).*
Seyferth, et al, "Linear polysiloxanes from dichlorosilane", Inorg. Chem. 1984, pp. 4412-4417, vol. 23.
Schumb, et al, "Partial hydrolysis of silicon tetrachloride", URL:https://pubs.acs.org/doi/pdf/10.1021/ja01195a522, p. 726m col. 1, paragraph 3-4.
Search report for corresponding International Search Report Application No. PCT/US2018/034344 dated Aug. 31, 2018.
Unno, et al, "Tip-substituted cage and cyclic silanols", Journal of Organometallic Chemistry, 2003, pp. 175-182, vol. 686.
Seki, et al, "Stereochemistry of the reaction of cis, trans,cis-2,4,6,8-tetraisocyanato-2,4,6,8-tetramethylcyclotetrasiloxane with triphenyisilanol and 1,1,3,3-tetraphenyldisiloxane-1,3-diol", Journal of Organometallic Chemistry, 2011, pp. 846-851, vol. 696.
Basenko,et al, Hexa(organylsilsesquioxanes)*, Russian Chemical Bulletin, International Edition, Apr. 2016, pp. 1034-1038, vol. 65, No. 4.
Stock, et al. "Silicon hydrides VII: On prosiloxane SiH2(O)", Jan. 1, 1919, Chemische Berichte, VCH DE, vol. 52, No. 9, pp. 1851-1860.

* cited by examiner

Primary Examiner — Alexander R Pagano
(74) Attorney, Agent, or Firm — S. Matthew Cairns

(57) ABSTRACT

A method of producing a halosiloxane, the method comprising: i) combining water, a halosilane, and a first solvent to form a reaction mixture, ii) partially hydrolyzing and condensing the halosilane to form a reaction product mixture comprising the halosiloxane, the solvent, unreacted halosilane, and hydrogen halide, iii) adding a second solvent, where the second solvent has a boiling point the boiling point of the halosiloxane, to the reaction mixture in i) or to the reaction product mixture in ii), and iv) recovering the halosiloxane from the reaction product mixture.

11 Claims, No Drawings

METHOD OF MAKING A HALOSILOXANE

CROSS-REFERENCE TO RELATED APPLICATIONS

None.

FIELD OF THE INVENTION

A method of producing a halosiloxane comprising combining water, a halosilane, and a solvent to form a reaction mixture and causing the partial hydrolysis and condensation of the halosilane to form a reaction product mixture comprising the halosiloxane, a hydrogen halide, solvent and unreacted halosilanes and recovering the halosiloxane from the reaction product mixture.

BACKGROUND OF THE INVENTION

Halosiloxanes may be used in several industrial processes. For example, Halosiloxanes may be used as an intermediated in the production of additional polysiloxanes by the hydrolysis with other chlorosilanes and chlorosiloxanes. In addition, halosiloxanes may be useful in other processes such as a filler treatment.

Halosiloxanes, such as 1,1,3,3-tetrachlorodisiloxane, have been produced by the partial hydrolysis of trichlorosilane, in diethyl ether at −78° C.

Several additional synthetic methods have been to taught for making hexachlorodisiloxane which include chlorination of disiloxane with chlorine, high temperature oxidation of silicon tetrachloride by oxygen or sulfur trioxide, or oxidation of hexachlorodisiloxane by sulfur trioxide or acetone. Partial hydrolysis of silicon tetrachloride was also taught.

A high temperature process to make 1,1,1,3,3-pentachlorodisiloxane has been taught involving thermolysis to form dichlorosilanone which inserts into trichlorosilane to form the target compound.

However, these methods have drawbacks. For example, the methods may require extreme temperatures or have difficulty in the isolation of the chlorosiloxane. Both of these issues pose difficulties on an industrial scale. Thus, there is a need for new methods of producing halosiloxanes that can be used to produce a halosiloxane on an industrial scale, that do not require extreme temperatures, and that allow the halosiloxane to be removed from the solvent rather than the solvent removed from the halosiloxane.

BRIEF SUMMARY OF THE INVENTION

The present invention is directed to method of producing a halosiloxane, the method comprising: i) combining water, a halosilane, and a first solvent to form a reaction mixture, ii) partially hydrolyzing and condensing the halosilane to form a reaction product mixture comprising the halosiloxane, the solvent, unreacted halosilane, and hydrogen halide, iii) adding a second solvent, where the second solvent has a boiling point≥the boiling point of the halosiloxane, to the reaction mixture in i) or to the reaction product mixture in ii), and iv) recovering the halosiloxane from the reaction product mixture.

The methods of the invention allow for the production of halosiloxanes by partial hydrolysis more easily at industrial scale and for the isolation of the resulting halosiloxane from the solvent versus having to remove the solvent from the halosiloxane.

DETAILED DESCRIPTION OF THE INVENTION

A method of producing a halosiloxane, the method comprising:
i) combining water, a halosilane, and a first solvent to form a reaction mixture,
ii) partially hydrolyzing and condensing the halosilane to form a reaction product mixture comprising the halosiloxane, the solvent, unreacted halosilane, and hydrogen halide,
iii) adding a second solvent, where the second solvent has a boiling point≥the boiling point of the halosiloxane, to the reaction mixture in i) or to the reaction product mixture in ii), and
iv) recovering the halosiloxane from the reaction product mixture.

The water, halosilane, and first solvent are combined in i) to form the reaction mixture.

The halosilane is a silane having one or more than one, alternatively 2 or more, halogen atom, alternatively chlorine atom, with the remaining valences bonded to a hydrocarbyl group having from 1 to 8 carbon atoms, alternatively 1 to 3 carbon atoms, alternatively 2 carbon atoms, a hydrogen atom, or a hydrocarbyl group having from 1 to 8 carbon atoms, alternatively 1 to 3 carbon atoms, alternatively 2 carbon atoms, and a hydrogen atom. In one embodiment, the halosilane is according to formula (I)

$$R^1_a X_b SiH_{4-a-b} \tag{I}$$

where $R^1$ is hydrocarbyl having from 1 to 8 carbon atoms, alternatively 1 to 3 carbon atoms, alternatively 2 carbon atoms, alternatively $R^1$ represents methyl and ethenyl groups, X is halo, alternatively chloro, a is an integer from 0 to 2, b is an integer from 1 to 4, alternatively 2 to 4, alternatively 3 or 4, alternatively 2, alternatively 3, alternatively 4.

The hydrocarbyl groups represented by $R^1$ typically have from 1 to 8 carbon atoms, alternatively 1 to 3 carbon atoms, alternatively 2 carbon atoms. Groups represented by $R^1$ having at least 3 carbon atoms can have a branched or linear structure. Examples of groups represented by $R^1$ include, but are not limited to, alkyl, such as methyl, ethyl, propyl, 1-methylethyl, butyl, 1-methylpropyl, 2-methylpropyl, 1-ethylethyl, pentyl, hexyl, and cyclohexyl, alkenyl, such as ethenyl, propenyl, butenyl, and hexenyl, alkynyl, such as ethynyl, propynyl, butynyl, and hexynyl, and aryl, such as phenyl, benzyl, and methylphenyl.

Examples of the halosilane include, but are not limited to, dichloromethylvinylsilane (MeViSiCl$_2$), trichlorovinylsilane (ViSiCl$_3$), trichlorosilane (HSiCl$_3$), tetrachlorosilane (SiCl$_4$), or a mixture of trichlorosilane and tetrachlorosilane. Methods of making dichloromethylvinylsilane, trichlorovinylsilane, trichlorosilane and tetrachlorosilane are known in the art and are available commercially.

The first solvent is any solvent that is compatible with water, halosilane and halosiloxane, and in which the hydrolysis and condensation of the halosilanes will occur. As used herein, "compatible" is intended to mean that the solvent will not react with, but will solubilize, the halosilane, the water, the halosiloxane.

In one embodiment, the first solvent has a water solubility of >1.5 grams in 100 ml of solvent, alternatively greater than 25 grams in 100 ml of solvent, alternatively water is miscible with the solvent in all proportions. The water solubility is determined at 25° C. and standard pressure by mixing different proportional of water with a particular solvent and noting any immiscibility. One skilled in the art would know how to determine water miscibility, and the values are reported in the literature for many solvents. The first solvent is not water. The solvent is also miscible and does not react with the halosilanes and the halosiloxane.

Examples of the first solvent include, but are not limited to ethereal solvents including dialkyl ether, tetrahydrofuran, glycol ether, crown ether and dioxane, or a polar aprotic solvent including a ketone, a nitrile, a formamide, an acetamide, a sulfoxide, an acetate, a phosphoramide, a pyrrolidinone, a nitroalkane, or a carbonate. Alternatively, the first solvent is acetonitrile, tetrahydrofuran, tetraethylene glycol dimethyl ether, diethylene glycol dimethyl ether, diethylene glycol dibutyl ether or poly(ethylene glycol) dimethyl ether, or a combination thereof, alternatively tetrahydrofuran, acetonitrile, or tetraethylene glycol dimethyl ether. These solvents are available commercially.

The first solvent is combined with the water and halosilanes by methods known in the art. One skilled in the art would know how to combine the halosilanes and the first solvent. In one embodiment, the components of the reaction mixture may be added in any order, alternatively the water and solvent are combined first with agitation followed by the combination of the water and solvent combination with the halosilane, alternatively the water and solvent are combined first with agitation followed by the addition of the combined water and solvent mixture to the halosilane with agitation. Typically the combined water and solvent are added to the halosilane over time with agitation. One skilled in the art would understand that minor variations of the order of addition, such as keeping some solvent from the combination with water for the addition after the water addition would not materially alter the invention.

The combining of the water and first solvent are typically combined in a separate reactor or other vessel or tank, and the combination of the water and first solvent are added from the separate reactor, tank or vessel to a reactor where they are combined with the halosilane for the partial hydrolysis of the halosilane, alternatively the combination of the water and first solvent are added from the vessel in which they were combined into a reactor where the halosilane is contained for the partial hydrolysis and condensation. One skilled in the art would know how to pick a suitable reactor and/or vessel for the combination of the water and first solvent and the combination of the water and first solvent with the halosilane.

The rate of addition at which the water and first solvent are combined is not critical but the solvent and water are typically mixed before combining with the halosilane.

The rate of addition of the combined water and first solvent to the halosilane is sufficient to allow the reaction to proceed but not so fast that an undesirable exotherm occurs, alternatively the water-solvent combination is added to the halosilane over a period of up to 5 hours, alternatively over a period of up to 2 hours, alternatively over a period of up to 1.5 hours, alternatively over a period of up to 1 hour.

The reaction mixture comprises the water, halosilane and the solvent and has a temperature above the melting point of the solvent, alternatively between −70° C. and the reflux temperature of the halosilane, alternatively between −30° C. and the reflux temperature of the halosilane, alternatively between 0° C. and the reflux temperature of the halosilane, alternatively between 10° C. and 30° C. One skilled in the art would understand how to determine the melting point of the solvent. The reflux temperature of halosilane is typically up to 100° C. at the pressure of up to 100 kPa, or up to 150° C. at the pressure of up to 150 kPa. One skilled in the art would know how to control the temperature of the reaction mixture. For example, a cool reaction mixture may be allowed to warm using the surrounding air temperature or may be warmed using a heating mantle, steam jacket, or other method of heating a reaction known in the art. Alternatively, the reaction mixture may need to be cooled to prevent an undesirable exotherm. One skilled in the art would know how to cool the reaction mixture if required.

The reaction mixture is at a pressure from 0.1 kPa up to 150 kPa, alternatively from a pressure from 5 kPa to 110 kPa, alternatively at a pressure from 90 kPa to 101 kPa. One skilled in the art would know how to control the pressure of the reaction mixture.

The ratio of water and halosilane in the reaction mixture is sufficient to partially hydrolyze the halosilane and form the halosiloxane, alternatively the mole ratio of water to halosilane in the reaction mixture is from 4:1 to 1:100, alternatively from 2:1 to 1:10, alternatively from 1:1 to 1:10, alternatively from 1:1 to 1:1.5.

The concentration of first solvent in the reaction mixture may vary. One skilled in the art would know how to vary the concentration of solvent to control properties such as, but not limited to, reaction rate and solvency. The reaction mixture comprises up to 90%, alternatively up to 75%, alternatively up to 50%, alternatively from 25 to 50%, alternatively from 30 to 75%, based on the total weight of the reaction mixture, of the first solvent.

The halosilane is partially hydrolyzed and condensed in ii) to form a reaction product mixture comprising the halosiloxane, first solvent, hydrogen halide, and unreacted halosilane.

The halosiloxane comprised by the reaction product mixture is a chlorosiloxane, alternatively a halodisiloxane, alternatively a chlorodisiloxane, alternatively 1,1,3,3-tetrachlorodisiloxane, alternatively 1,1,1,3,3-pentachlorodisiloxane, alternatively hexachlorodisiloxane, alternatively a mixture of two or more of 1,1,3,3-tetrachlorodisiloxane, 1,1,1,3,3-pentachlorodisiloxane, and hexachlorodisiloxane. The halosiloxane can be identified using analytical methods and instrumentation or a combination thereof known in the art. For example, the halosiloxane may be determined using $^{29}$Si-NMR, $^{1}$H-NMR and/or gas chromatography.

The halide of the hydrogen halide is from the halosilane and, therefore, the hydrogen halide comprises the same halogen atoms as the halosilane.

The solvent and halosilane are as described above for the reaction mixture. Unreacted halosilane is the same as the halosilane described for the reaction mixture.

The reaction product mixture may comprise an additional material. Examples of the additional material include, but are not limited to, polymeric hydrolysis byproducts having three or more silicon atoms.

The halosilanes is partial hydrolysis and condensation by subjecting the reaction mixture to the temperature and pressure conditions described above for the reaction mixture until the partial hydrolysis is complete. In some embodiments, the partial hydrolysis and condensation occurs at temperatures above the temperature at which the water, solvent, and halosilane are combined. One skilled in the art would know how to increase the temperature of the reaction mixture to cause the partial hydrolysis and condensation of the halosilane to occur. In another embodiment, the reaction mixture is maintained at a temperature below 20° C. to prevent an unwanted exotherm.

The partial hydrolysis and condensation is conducted until at least some, alternatively the desired amount, of the halosiloxane is formed, alternatively the partial hydrolysis and condensation is conducted for up to 48 hours, alternatively for 12 hours, alternatively for 5 hours, alternatively for 1 hour. One skilled in the art would know how to determine when the partial hydrolysis and condensation are complete and the halosiloxane is formed. For example, the method could be monitored using chromatography methods, such as gas chromatography with a thermo conductivity detector, and the reaction stopped when no further halosiloxane is being produced.

The hydrolysis of the halosilane may be controlled to provide only partial hydrolysis by limiting the amount of water in the reaction mixture and/or stopping the hydrolysis before complete hydrolysis occurs by methods known in the art such as reducing the temperature of the reactants, diluting the reaction mixture with additional solvent, and recovering the halosiloxane product from the reaction mixture before complete hydrolysis can occur.

The partial hydrolysis and condensation is typically conducted with agitation. One skilled in the art would know how to agitate the reaction mixture depending upon the reaction vessel employed.

The partial hydrolysis and condensation is conducted in any reactor that is typically used for the hydrolysis and condensation of a halosilanes. For example, the hydrolysis and condensation may be conducted in a round bottom flask, a sealed tube reactor, or a jacketed reactor. One skilled in the art would know how to pick a suitable reactor for the partial hydrolysis and condensation.

In iii) a second solvent, where the second solvent has a boiling point≥the boiling point of the halosiloxane, is added to the reaction mixture in i) or to the reaction product mixture in ii).

The second solvent has a boiling point of at least the boiling point of the halosiloxane, alternatively the solvent has a boiling point of at least 100° C., alternatively 110° C.

Examples of the second solvent include, but are not limited to, hydrocarbon solvents comprising alkanes, alkenes or aromatics, or an ethereal solvents comprising dialkyl ether, glycol ether, crown ether or dioxane, or a polar aprotic solvent comprising a ketone, a nitrile, a formamide, an acetamide, a sulfoxide, an acetate, a phosphoramide, a pyrrolidinone, a nitroalkane, or a carbonate.

In one embodiment, the solvent is tetraethylene glycol dimethyl ether, diethylene glycol dimethyl ether, diethylene glycol dibutyl ether, or poly(ethylene glycol) dimethyl ether. These solvents are available commercially.

The first and second solvent may be the same of different, alternatively the first and second solvents are different, alternatively the first and second solvent are the same.

The second solvent is added by conventional means known in the art. One skilled in the art would know how to add the second solvent to the reaction mixture, the reaction product mixture or both the reaction mixture and the reaction product mixture. In one embodiment, the second solvent is added in i) with the first solvent. In another embodiment, the first and second solvents are the same and have a boiling point as described above in relation to the halosiloxane and the halosiloxane may be recovered directly from the first solvent. When the first solvent has a boiling point below the boiling point of the halosiloxane, a second solvent is required to enable the removal of the halosiloxane from the second solvent by methods such as distillation.

The halosiloxane is recovered in iv) from the reaction product mixture.

The halosiloxane may be recovered by methods known in the art. Examples of methods of recovering the halosiloxane include, but are not limited to, distillation, vacuum stripping, evaporation, extraction or chromatography. In one embodiment, the halosiloxane is recovered by distillation or vacuum stripping. By recovering the halosiloxane from the second solvent, the process allows for easier recovery with lower potential for the generation of byproducts, reduced waste, and potential elimination of the need to filter the insoluble byproducts from the product halosiloxane.

The halosiloxane produced by the methods of the invention may be used as a precursor or intermediate to make additional siloxanes or in treating fillers.

Where not indicated in this application temperatures and pressures are standard temperature and pressure.

The method of the invention allows for the recovery of the halosiloxane by removing the halosiloxane from a solvent of greater boiling point temperature than the halosiloxane rather than removing a lower boiling solvent from the halosiloxane.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %.

TABLE 1

List of abbreviations used in the examples.

| Abbreviation | Word |
|---|---|
| g | gram |
| Me | methyl |
| wt | weight |
| % | percent |
| mol | mole |
| hr | hour |
| ° C. | ° C. |
| NA | Not Applicable |
| mL | milliliters |
| cm | Centimeter |
| TEGDME | tetraethylene glycol dimethyl ether |
| TCDSO | 1,1,3,3-tetrachlorodisiloxane |
| PCDSO | 1,1,1,3,3-pentachlorodisiloxane |
| HCDSO | hexachlorodisiloxane |
| GC-TCD | Gas Chromatography with Thermal Conductivity Detector |
| Vinyl | A vinyl group (—CH$_2$=CH$_2$) |
| CMVDSO | 1,3-dichloro-1,3-dimethyl-1,3-divinyldisiloxane |
| CVDSO | 1,1,3,3-tetrachloro-1,3-divinyldisiloxane |

TABLE 2

Boiling points and melting point of various example components.

| Component | Boiling Point (° C.) | Melting Point (° C.) |
|---|---|---|
| TEGDME | 275 | −30 |
| TCDSO | 100 | NA |
| PCDSO | 133 | NA |
| HCDSO | 137 | NA |

Example 1

Synthesis of TCDSO:

A water-TEGDME solution was prepared by adding 6.65 g (0.37 mol) of water to 100 g of pre-dried TEGDME. The water-TEGDME solution was added to 100.0 g (0.74 mol) of trichlorosilane (TCS) in a 250 ml round-bottom flask at 0-18° C. in 30 minutes under agitation. After the addition, the clear reaction mixture was warmed up and agitated at room temperature for 1 hours. Then the reaction mixture was stripped under vacuum down to 1 torr while the flask was gradually heated up to 60° C. During the vacuum stripping, the crude product (25.0 g) was condensed in a cold trap. The crude product contained 2% HCl, 72% unreacted TCS, 26% TCDSO and less than 1% chloro higher siloxanes (all numbers are GC-TCD integration percentages). The yield of TCDSO was estimated to be 8.5%. The crude product was later fractionally distilled through a column to yield 99+% TCDSO.

Example 2

Synthesis of TCDSO at Larger Scale:

A water-TEGDME solution was prepared by adding 50.0 g (2.77 mol) of water to 1 L of TEGDME. The water-TEGDME solution was added over 1 hr to 1125 g (8.30 mol) of trichlorosilane (TCS) in a 2 L agitated jacketed reactor, while maintaining the contents' temperature below 20° C. After the addition, the clear reaction mixture was stripped under vacuum down to 1 torr through a dry ice trap, after which the largely TCS material from the trap (327 g) was emptied. Then the reactor contents were gradually heated up to 70° C. while continuing to strip under full vacuum. During the vacuum stripping, the crude product (246 g) was condensed in a dry ice trap. The crude product contained 71% unreacted TCS, 25% TCDSO and less than 3% chloro higher siloxanes (all numbers are GC-TCD integration percentages). The yield of TCDSO was estimated to be 10.3% based on $H_2O$. The crude product was later fractionally distilled through a column to yield 99+% TCDSO.

Example 3

Synthesis of PCDSO:

A water-TEGDME solution was prepared by adding 0.133 g (7.38 mmol) of water to 2.0 g of pre-dried TEGDME. The water-TEGDME solution was added to a pre-mix of 1.00 g (7.38 mmol) of trichlorosilane (TCS) and 1.25 g (7.38 mmol) of silicon tetrachloride (STC) in a 50 ml round-bottom flask at 0° C. in 5 minutes under agitation. After the addition, the clear reaction mixture was warmed up and agitated at room temperature for 1 hours. PCDSO and TCDSO were formed at about 1.7:1 wt ratio based on GC-TCD analysis.

Example 4

Synthesis of HCDSO:

A water-TEGDME solution was prepared by adding 0.265 g (14.7 mmol) of water to 10.0 g of pre-dried TEGDME. Then the water-TEGDME solution was added to 5.00 g (29.4 mmol) of silicon tetrachloride (STC) in a 50 ml round-bottom flask at 0° C. in 7 minutes under agitation. After the addition, the clear reaction mixture was warmed up and agitated at room temperature for 2 hours. HCDSO and a few by-products were detected with GC-TCD. The by-products disappeared and the conversion to HCDSO increased after the reaction mixture was bodied for 1 days at room temperature. No gel was formed in the process.

Example 5

Synthesis of HCDSO in Tetrahydrofuran

A water-tetrahydrofuran solution was prepared by adding 1.61 g (0.09 mol) of water to 31.13 g (0.42 mol) of dry tetrahydrofuran in a scintillation vial. In a positive argon purge, the water-tetrahydrofuran solution was quickly poured into a 100-mL round bottom flask charged with 61.05 g (0.36 mol) of $SiCl_4$ at room temperature while stirring. During the addition, a mild reflux was observed on the wall of the flask. The reaction was stirred at room temperature for 2 hours and then fractionally distilled at atmospheric pressure to obtain 95% pure material. Yield=5.3029 g (isolated, 22.7% using water as the limiting reagent).

Comparative Example 1

Synthesis of HCDSO in Diethyl Ether at −40° C.

In a 50 mL Schlenk flask, 7.08 g (0.04 mol) of $SiCl_4$ was dissolved in 5.81 g (0.08 mol) of diethyl ether and the reaction was cooled to −40° C. while stirring. A water-diethyl ether mixture was prepared by combining 0.17 g (0.009 mol) of water and 6.10 g (0.08 mol) of diethyl ether in a scintillation vial. The wet solvent was added to the reaction flask dropwise via a syringe while the reaction mixture maintained vigorous stirring over the course of 30 minutes. At the end of the addition, the reaction was maintained at −40° C. for an additional 2 hours before warming up to room temperature, at which point the reaction mixture became cloudy. An aliquot of the reaction mixture was analyzed by GC-TCD to find HCDSO content of 2.7 wt %, which give it a maximum yield of 19.2% using water as the limiting reagent. The in situ yield is an overestimate of the true value as it assumes that all components are accounted for. This assumption was not valid since a significant amount of solid precipitate was excluded during the characterization. Reactions in diethyl ether above −40° C. is not practical due to the heavy amount of solid precipitation.

Example 6

Synthesis of CMVDSO at an Elevated Temperature

To a 250 ml round-bottom flask was loaded 51.9 g (0.367 mol) of dichloromethylvinylsilane, $Cl_2SiMeVinyl$. While the starting material was refluxed in the flask, a solution of 3.31 g (0.184 mol) of water in 30.0 ml of TEGDME was added dropwise in 39 minutes. The reaction temperature varied between 80 and 93° C. The HCl by-product was vented through a 1.0 M NaOH scrubber. After the addition, the reaction mixture was maintained at 90° C. for 60 minutes. Than it was distilled under vacuum at up to 90° C. pot temperature and down to 1 torr pressure. The distillate condensed at 0° C. contained 10.4 g of CMVDSO, which accounted for 25% isolated yield.

Example 7

Synthesis of CMVDSO

To a 250 ml round-bottom flask was loaded 60.0 g (0.425 mol) of dichloromethylvinylsilane, $Cl_2SiMeVinyl$. While the starting material was refluxed in the flask, a solution of 1.92 g (0.106 mol) of water in 30.0 ml of TEGDME was added dropwise in 35 minutes. The reaction temperature varied between 87 and 96° C. The HCl by-product was vented through a 1.0 M NaOH scrubber. After the addition, the reaction mixture was maintained at 90° C. for 60 minutes. Than it was distilled under vacuum at up to 90° C. pot temperature and down to 1 torr pressure. The distillate condensed at 0° C. contained 9.8 g of CMVDSO, which accounted for 41% isolated yield. Out of this crude product was fractionally distilled 99.6% pure CMVDSO.

Example 8

Synthesis of CVDSO at an Elevated Temperature

To a 250 ml round-bottom flask was loaded 120.0 g (0.743 mol) of trichlorovinylsilane, $Cl_3SiVinyl$. While the starting material was refluxed in the flask, a solution of 3.34 g (0.186 mol) of water in 52.8 ml of TEGDME was added dropwise in 20 minutes. The reaction temperature varied between 83 and 95° C. The HCl by-product was vented through a 1.0 M NaOH scrubber. After the addition, the reaction mixture was maintained at 90° C. for 60 minutes. Than it was distilled under vacuum at up to 90° C. pot temperature and down to 1 torr pressure. The distillate condensed at 0° C. contained 11.0 g of CVDSO, which accounted for 22% isolated yield. Out of this crude product was fractionally distilled 99.6% pure CVDSO.

That which is claimed is:

1. A method of producing a halosiloxane, the method comprising:
   i) combining water, a halosilane, and a first solvent to form a reaction mixture,
   ii) partially hydrolyzing and condensing the halosilane to form a reaction product mixture comprising the halosiloxane, the solvent, unreacted halosilane, and hydrogen halide,
   iii) adding a second solvent, where the second solvent has a boiling point≥the boiling point of the halosiloxane, to the reaction mixture in i), to the reaction product mixture in ii), or to the reaction mixture in i) and the reaction product mixture in ii), and
   iv) recovering the halosiloxane from the reaction product mixture;
   wherein the halosiloxane is a halodisiloxane.

2. A method according to claim 1, wherein the halosilane is dichlormethylvinylsilane, trichlorovinylsilane, trichlorosilane, tetrachlorosilane or a mixture of trichlorosilane and tetrachlorosilane.

3. A method according to claim 1, wherein the halodisiloxane is 1,3-dichloro-1,3-dimethyl-1,3-divinyldisiloxane, 1,1,3,3-tetrachloro-1,3-divinyldisiloxane, 1,1,3,3-tetrachlorodisiloxane, 1,1,1,3,3-pentachlorodisiloxane, or hexachlorodisiloxane.

4. A method according to claim 1, wherein the partial hydrolysis and condensation is at a temperature from −30° C. to the reflux temperature of the halosilane.

5. A method according to claim 1, wherein the reaction mixture is at a pressure from 0.1 kPa up to 150 kPa.

6. A method according to claim 1, wherein the second solvent is a hydrocarbon solvent comprising an alkanes, alkene or aromatics, an ethereal solvent comprising a dialkyl ether, glycol ether, crown ether or dioxane, or a polar aprotic solvent comprising a ketone, a nitrile, a formamide, an acetamide, a sulfoxide, an acetate, a phosphoramide, a pyrrolidinone, a nitroalkane, or a carbonate.

7. A method according to claim 6, wherein the second solvent is tetraethylene glycol dimethyl ether, diethylene glycol dimethyl ether, diethylene glycol dibutyl ether or poly(ethylene glycol) dimethyl ether.

8. A method according to claim 1, wherein the halosiloxane is recovered from the reaction product mixture by distillation, vacuum stripping, evaporation, extraction or chromatography.

9. A method according to claim 1, wherein the mole ratio of water to halosilane combined to form the reaction mixture is from 4:1 to 1:100.

10. A method according to claim 1, wherein the amount of first solvent in the reaction mixture is up to 75% (w/w).

11. A method according to claim 1, wherein the first solvent and the second solvent are the same.

* * * * *